(12) United States Patent
Choi (10) Patent No.: US 7,119,862 B2
(45) Date of Patent: Oct. 10, 2006

(54) REFLECTIVE LCD DEVICE HAVING THE FIRST PHOTO-ACRYL LAYER BEING OUT OF DIRECT CONTACT WITH THE DATA LINE AND METHOD FOR MANUFACTURING THE SAME

(75) Inventor: Su Seok Choi, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 107 days.

(21) Appl. No.: 10/747,202

(22) Filed: Dec. 30, 2003

(65) Prior Publication Data
US 2004/0239845 A1 Dec. 2, 2004

(30) Foreign Application Priority Data
May 30, 2003 (KR) .................... 10-2003-0034861

(51) Int. Cl.
G02F 1/1335 (2006.01)
(52) U.S. Cl. .................. 349/113; 349/114; 349/138
(58) Field of Classification Search ........ 349/113–114, 349/138
See application file for complete search history.

(56) References Cited

U.S. PATENT DOCUMENTS

| | | | |
|---|---|---|---|
| 5,926,242 A * | 7/1999 | Kataoka et al. ............. | 349/117 |
| 6,452,653 B1 * | 9/2002 | Yamanaka et al. .......... | 349/113 |
| 6,577,372 B1 * | 6/2003 | Zhang et al. ................ | 349/152 |
| 6,757,037 B1 * | 6/2004 | Matsuo et al. .............. | 349/113 |
| 6,853,417 B1 * | 2/2005 | Chien et al. ................. | 349/113 |
| 6,862,050 B1 * | 3/2005 | Rho et al. ..................... | 349/44 |
| 6,914,641 B1 * | 7/2005 | Choo et al. ................... | 349/38 |
| 2002/0113926 A1 * | 8/2002 | Hanazawa et al. .......... | 349/113 |
| 2003/0102560 A1 * | 6/2003 | Kim et al. ................... | 257/737 |
| 2004/0021810 A1 * | 2/2004 | Kawaguri et al. .......... | 349/113 |
| 2005/0052597 A1 * | 3/2005 | Kanou et al. ............... | 349/113 |

FOREIGN PATENT DOCUMENTS

KR        2002018329 A  *  3/2002

* cited by examiner

*Primary Examiner*—Andrew Schechter
*Assistant Examiner*—(Nancy) Thanh-Nhan P Nguyen
(74) *Attorney, Agent, or Firm*—Birch, Stewart, Kolasch, and Birch, LLP

(57) ABSTRACT

A liquid crystal display device and a method for manufacturing the same includes a liquid crystal display having a thin film transistor on a substrate; an insulating layer on an entire surface of the substrate including the thin film transistor; a first photo-acryl layer on the insulating layer; a plurality of protrusions on the first photo-acryl layer at fixed intervals, the plurality of protrusions being formed of a second photo-acryl layer; and a reflective electrode on the first photo-acryl layer including the protrusions for being connected to a predetermined portion of the thin film transistor. The liquid crystal display device is provided for maximizing reflection efficiency.

26 Claims, 13 Drawing Sheets

FIG. 11B

REFLECTIVE LCD DEVICE HAVING THE FIRST PHOTO-ACRYL LAYER BEING OUT OF DIRECT CONTACT WITH THE DATA LINE AND METHOD FOR MANUFACTURING THE SAME

CROSS-REFERENCES TO RELATED APPLICATIONS

This nonprovisional application claims priority under 35 U.S.C. § 119(a) on Korean Patent Application No. P2003-34861 filed on May 30, 2003, the entirety of which is herein incorporated by reference.

BACKGROUND OF THE INVENTION

1. Field of the Invention

The present invention relates to a liquid crystal display (LCD) device, and more particularly, to a liquid crystal display (LCD) device and a method for manufacturing the same that improves reflexibility by maximizing the density of protrusions.

2. Description of the Background Art

With the development of an information society, demands for various display devices are increasing. Accordingly, many efforts have been made to research and develop various flat display devices such as liquid crystal display (LCD), plasma display panel (PDP), electroluminescent display (ELD) and vacuum fluorescent display (VFD) devices. Some of these types of flat display devices are already applied to displays of various equipments.

Among the various flat display devices, the LCD device has been most widely used due to the advantageous characteristics of being thin, light in weight, and having a relatively low power consumption. The LCD device substitutes for the Cathode Ray Tube (CRT), and in addition to the mobile type LCD devices, e.g., such as a display for a notebook computer, the LCD devices have been developed for computer monitors and televisions to receive and display broadcasting signals.

Despite various technical developments in the LCD technology and associated applications in different fields, research in enhancing the picture quality of the LCD device has been in some respects lacking, e.g., as compared to other features and advantages of the LCD device. Therefore, in order to use the LCD device in various fields as a general display, the key to developing the LCD device lies on whether the LCD device can implement a high quality picture, e.g., such as retaining high resolution and high luminance with a large-sized screen while still being light in weight, thin, and requiring low power consumption.

The LCD device displays an image or a picture by controlling a light transmittance with an electric field applied to the liquid crystal having dielectric anisotropy. The LCD device is different from display devices such as an electroluminescence (EL) device, a cathode ray tube (CRT) and a light emitting diode (LED) device, which emit light by itself, in that the LCD device makes use of ambient light as a light source.

The LCD devices are classified into two different types, a transmitting type LCD device and a reflective type LCD device. The transmitting type LCD device has a backlight as a light source at the rear of an LCD panel, whereby the transmitting type LCD device can display colors by controlling the light transmittance incident on the liquid crystal according to the alignment of the liquid crystal. However, the transmitting type LCD device has problems in that it requires a relatively high power consumption. Meanwhile, the reflective type LCD device makes use of ambient light as the light source, thereby requiring a relatively small amount of power consumption.

Figure 1:
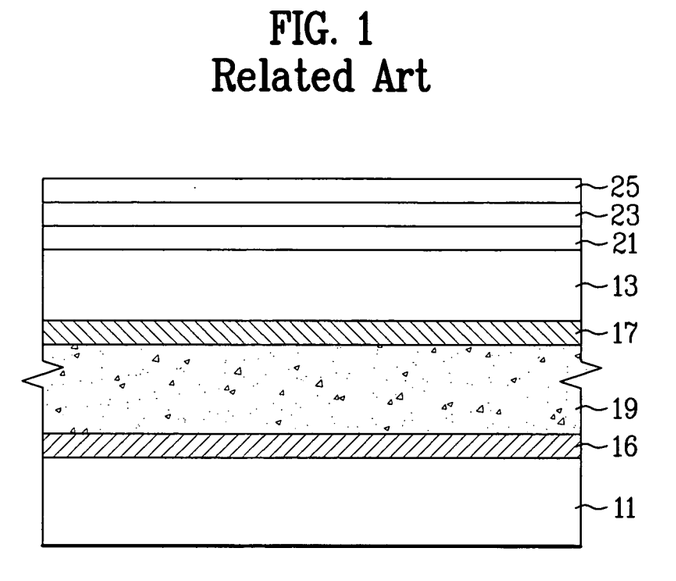
FIG. 1 is a cross-sectional view illustrating a general reflective type color LCD device of the background art.

FIG. 1 is a cross-sectional view illustrating a general reflective type LCD device of the background art. Referring to FIG. 1, the general reflective type LCD device includes an upper substrate 13 having a color filter layer (not shown) and a common electrode 17, a lower substrate 11 having a thin film transistor (not shown) and a reflective electrode 16, and a liquid crystal 19 between the lower and upper substrates 11 and 13. The liquid crystal 19 is the optical anisotropy medium controlling the light transmittance by aligning liquid crystal molecules in a predetermined direction according to the electric field. Herein, it is possible to use a predetermined medium having the optical anisotropy characteristics instead of the liquid crystal 19.

After that, a plurality of optical medium layers are formed on external surfaces of the respective lower and upper substrates 11 and 13 to control the polarizing state of light. For example, a light-scattering film 21, a phase difference plate 23 and a polarizing plate 25 are sequentially deposited on the upper substrate 13. Herein, the light-scattering film 21 is formed so as to provide a wide viewing angle for a viewer by scattering light, and the phase difference plate 23 includes a first phase difference film having characteristics of $\lambda/4$ plate to affect the light to the reflective electrode, and a second phase difference film having characteristics of $\lambda/2$ plate. When a voltage is not applied in a turn-off state, the phase of the light is inverted by the phase difference plate 23, thereby obtaining a phase difference. Thus, it is possible to emit a large amount of light to the outside so as to obtain an LCD panel having high luminance characteristics. Also, the polarizing plate 25 transmits the light at a wave direction of a transmitting axis, and absorbs the rest of the light.

Figure 2:
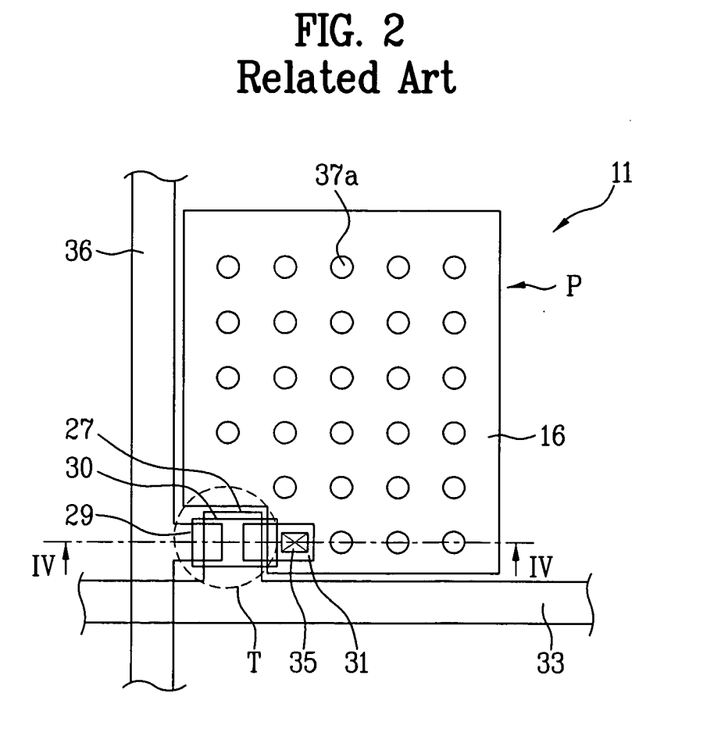
FIG. 2 is a plan view illustrating an LCD device including a reflective electrode having protrusions of the background art.

Hereinafter, a reflective type LCD device of the background art and a method for manufacturing the same will be described with reference to the accompanying drawings. FIG. 2 is a plan view illustrating a reflective type LCD device of the background art having a reflective electrode including a protrusion, and FIG. 3 is a cross-sectional view taken along line IV—IV of FIG. 2.

Figure 3:
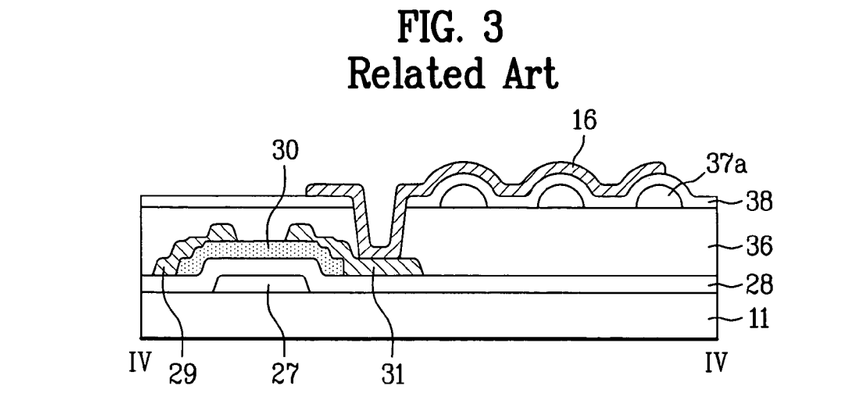
FIG. 3 is a cross-sectional view taken along line IV—IV of FIG. 2.

As shown in FIG. 2 and FIG. 3, a thin film transistor T is formed on a predetermined portion of a lower substrate 11 by a common technology, and a passivation layer 36 is formed on the lower substrate 11 having the thin film transistor T. Then, a plurality of photo-acryl protrusions 37a are formed on the passivation layer 36 at fixed intervals. At this time, the protrusions 37a are formed on an entire surface of the lower substrate 11 including the thin film transistor T at the fixed intervals, thereby improving a reflection angle of light.

A reflective electrode 16 is then formed for being electrically connected with a drain electrode of the thin film transistor on the passivation layer 36 including the protrusions 37a. At this time, the reflective electrode 16 has an uneven surface by the protrusions 37a formed on the passivation layer 36, so that it is possible to concentrate the light incident on the protrusions 37a at different angles, and to emit the light concentrated at a predetermined angle in case the light incident from the outside is reflected and emitted. An organic insulating layer 38 is formed on an entire surface of the lower substrate 11 including the protrusions 37a, and the reflective electrode 16 is formed on the organic insulating layer 38.

Figure 4A:
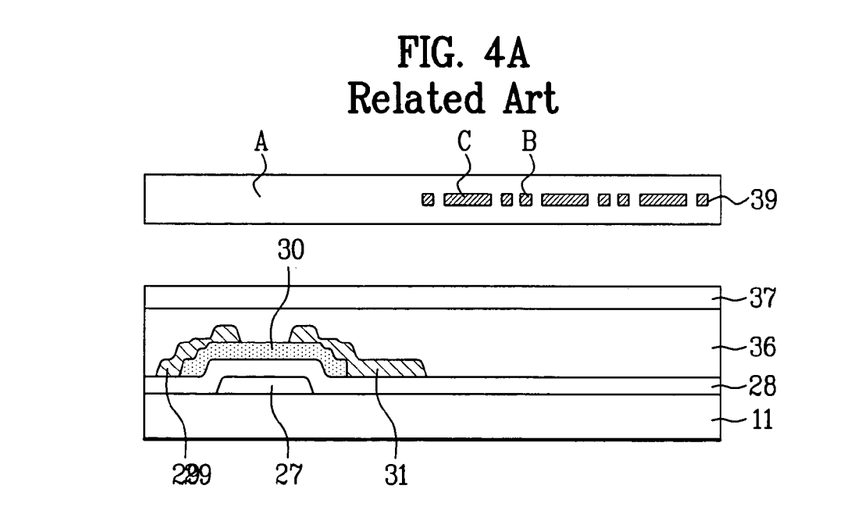
FIG. 4A to FIG. 4E are cross-sectional views illustrating manufacturing process steps of an LCD device of the background art taken along line IV—IV of FIG. 2.

FIG. 4A to FIG. 4E are cross-sectional views illustrating manufacturing process steps of a reflective type LCD device of the background art taken along line IV—IV of FIG. 2. As shown in FIG. 4A, the passivation layer 36 is formed on the entire surface of the lower substrate 11 including the thin film transistor (a gate electrode 27, a gate insulating layer 28, a source electrode 29, a drain electrode 31 and a semiconductor layer 30), and a first photo-acryl layer 37 is formed on the passivation layer 36. Subsequently, a diffraction mask 39 defined by a closed area A, a slit area B and a transmission area C is aligned above the first photo-acryl layer 37.

Figure 4B:
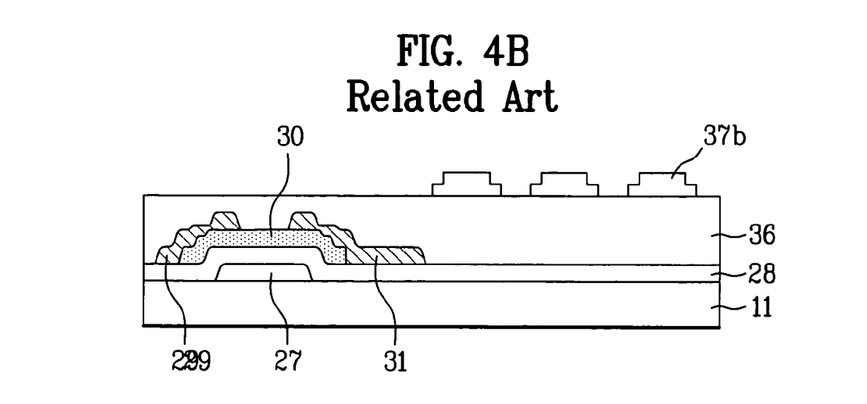

Referring to FIG. 4B, a diffraction exposure and developing process is performed to the first photo-acryl layer 37, thereby patterning a plurality of first photo-acryl patterns 37b at fixed intervals. By the diffraction mask 39, each of the first photo-acryl patterns 37b has a different thickness in the central and side portions thereof. That is, the portions of the first photo-acryl layer 37 corresponding to the slit area B and the transmission area C of the diffraction mask 39 are exposed differently to the light, whereby the central portion of the photo-acryl layer 37 has a different thickness as that of the side portion thereof.

Figure 4C:
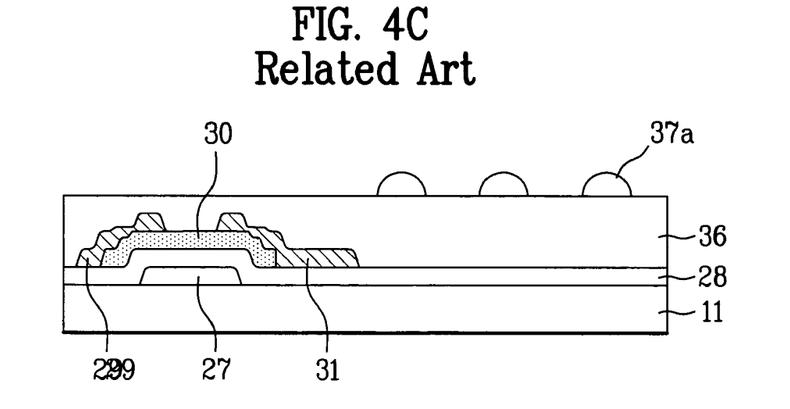
Figure 4D:
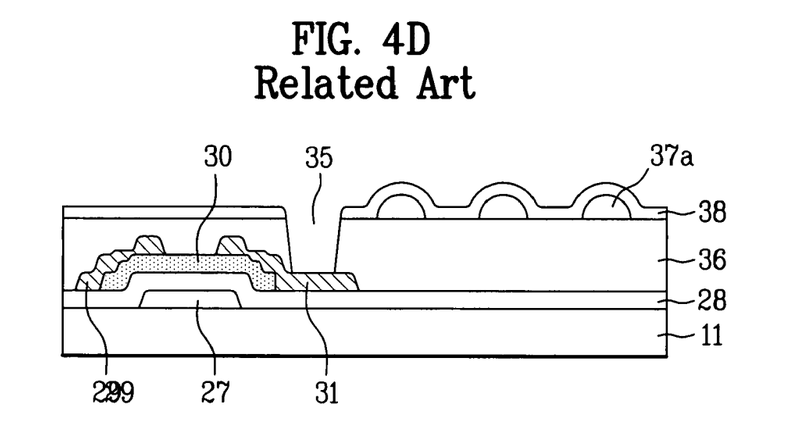

As shown in FIG. 4C, the hemisphere-shaped protrusions 37a are patterned by reflowing the first photo-acryl patterns 37b in a thermal treatment. Referring to FIG. 4D, a second photo-acryl layer 38 is formed on the entire surface of the lower substrate 11 including the hemisphere-shaped protrusions 37a. Then, the second photo-acryl layer 38 and the passivation layer 36 are selectively removed to expose the predetermined portion corresponding to the drain electrode 31 of the thin film transistor by photolithography, thereby forming a contact hole 35. At this time, the hemisphere-shaped protrusions 37a scatter the light greatly, so that the reflexibility of the light becomes low. In this respect, the second photo-acryl layer 38 is formed at a thickness between 1.5 μm and 2.0 μm, and then a thermo-hardening process is performed thereon, whereby the second photo-acryl layer 38 flows along the surface of the protrusions 37a. Accordingly, the second photo-acryl layer 38 fills up the space between the protrusions 37a, and the height of the hollow space between the protrusions 37a becomes lower, so that it is possible to obtain the protrusion having the height and the radius at a ratio of 1 to 10.

Figure 4E:
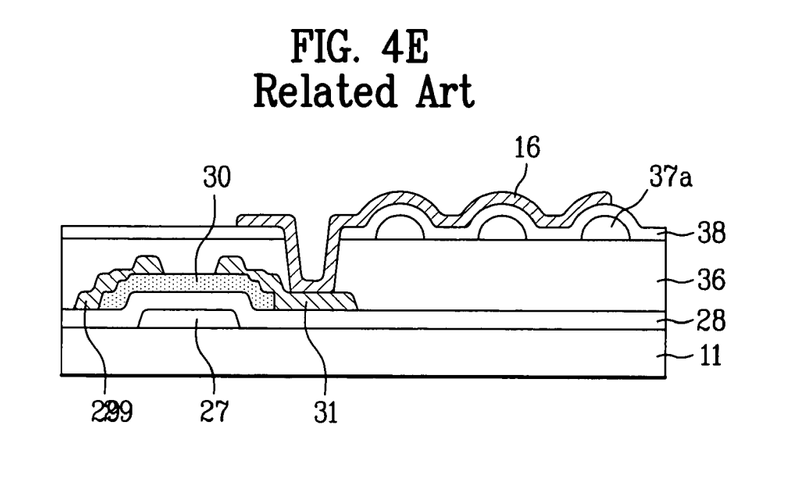

As shown in FIG. 4E, a conductive opaque metal layer such as aluminum Al having great reflexibility is deposited on the entire surface of the lower substrate 11 including the contact hole 35. Subsequently, the conductive opaque metal layer is selectively removed by photolithography, whereby the reflective electrode 16 is formed in a pixel region, for being in contact with the drain electrode 31.

In the reflective type LCD device of the background art, each of the photo-acryl patterns 37b has a different thickness in the central and side portions thereof by the diffraction exposure of the diffraction mask 39. That is, the step difference is generated in each of the photo-acryl patterns 37b by exposing the portions of the photo-acryl pattern differently to the light. Then, a melt-bake process is performed to the photo-acryl patterns 37b, thereby forming the hemisphere-shaped protrusions 37a by thermal-flow.

However, the present inventor has determined that the method for manufacturing the reflective type LCD device of the background art has the following disadvantages. In the method for manufacturing the reflective type LCD device of the background art, the specific exposure method such as the diffraction exposure process is performed as required to obtain accuracy of the diffraction mask.

Also, in the aforementioned method for manufacturing the reflective type LCD device of the background art, it is possible to decrease the hollow space between the protrusions in height by the second photo-acryl layer. However, it has the problem in that the manufacturing process steps are complicated and complex due to the thermal-flow characteristics. Also, during the process for forming the protrusions, it is required to maintain a predetermined space between the protrusions so as to avoid interference therebetween. Accordingly, the density of the protrusions becomes low.

Figure 11A:
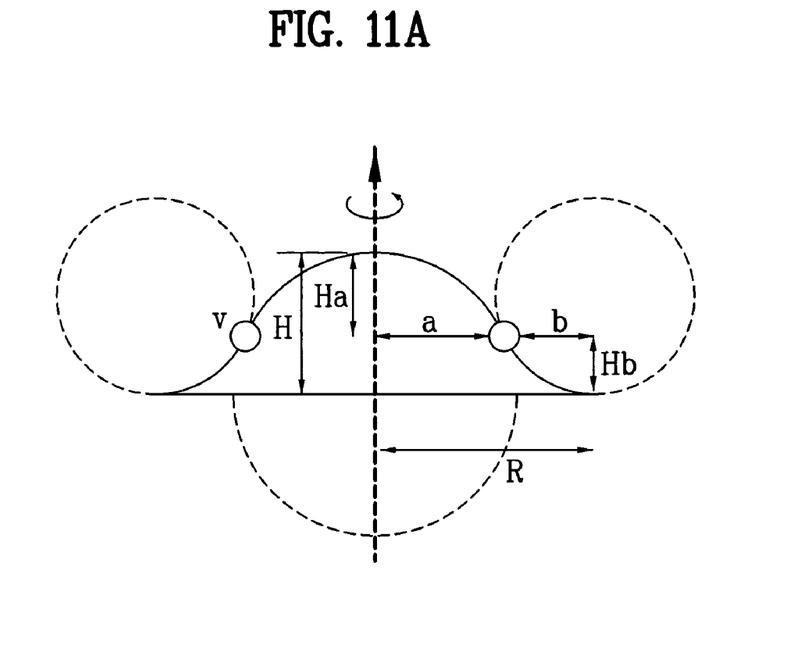
FIG. 11A and FIG. 11B are graphical views comparing a protrusion shape according to the present invention with that according to the background art.

In addition, as shown in FIG. 11A, an inflection point V exists in a curved surface profile of the protrusion by the second photo-acryl layer 38 formed on the entire surface including the protrusions 37a. As the inflection point V is positioned at the center of the protrusion, it has the problem of increasing mirror reflection.

SUMMARY OF THE INVENTION

The present invention overcomes the shortcomings associated with the background art and achieves other advantages not realized by the background art.

An aspect of the present invention is to provide a liquid crystal display (LCD) device and a method for manufacturing the same that substantially obviates one or more problems of the aforementioned liquid crystal display device of the background art.

An aspect of the present invention is to provide a liquid crystal display (LCD) device and a method for manufacturing the same, in which an inflection point V in a curved surface of a protrusion is removed so as to decrease mirror reflection, thereby maximizing reflexibility.

One or more of these and other aspects is accomplished by a liquid crystal display (LCD) device comprising thin film transistor on a substrate; an insulating layer on an entire surface of the substrate including the thin film transistor; a first photo-acryl layer on the insulating layer; a plurality of protrusions being formed on the first photo-acryl layer at fixed intervals, wherein the protrusions are formed of a second photo-acryl layer; and a reflective electrode being formed on the first photo-acryl layer, said reflective electrode being capable of being connected to a predetermined portion of the thin film transistor.

One or more of these and other aspects is accomplished by a method for manufacturing a liquid crystal display (LCD) device comprising forming an insulating layer on a substrate; forming a first photo-acryl layer on the insulating layer; performing a hard-cure process on the first photo-acryl layer; forming a plurality of second photo-acryl patterns on the first photo-acryl layer at fixed intervals; forming a plurality of protrusions by reflowing the second photo-acryl patterns; and forming a reflective electrode on an entire surface including the protrusions.

One or more of these and other aspects is accomplished by a method for manufacturing a liquid crystal display (LCD) device comprising forming a first insulating layer on an entire surface of a substrate including a thin film transistor; forming a first photo-acryl layer on the first insulating layer; performing a hard-cure process on the first photo-acryl layer; forming a plurality of second photo-acryl patterns on the first photo-acryl layer at fixed intervals; forming a plurality of protrusions by reflowing the second photo-acryl patterns; forming a reflective electrode on a predetermined portion of the first photo-acryl layer including the plurality of protrusions; forming a second insulating layer on an entire surface of the substrate including the reflective electrode; forming a contact hole exposing a predetermined portion of the thin film transistor by selectively removing the second insulating layer, the first photo-acryl layer and the first insulating layer; and forming a transparent electrode being electrically connected with the thin film transistor through the contact hole.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention will hereinafter be described with reference to the accompanying drawings. Wherever possible, the same reference numbers will be used throughout the drawings to refer to the same or similar parts. Hereinafter, a liquid crystal display (LCD) device and a method for manufacturing the same according to the present invention will be described with reference to the accompanying drawings.

Figure 5:
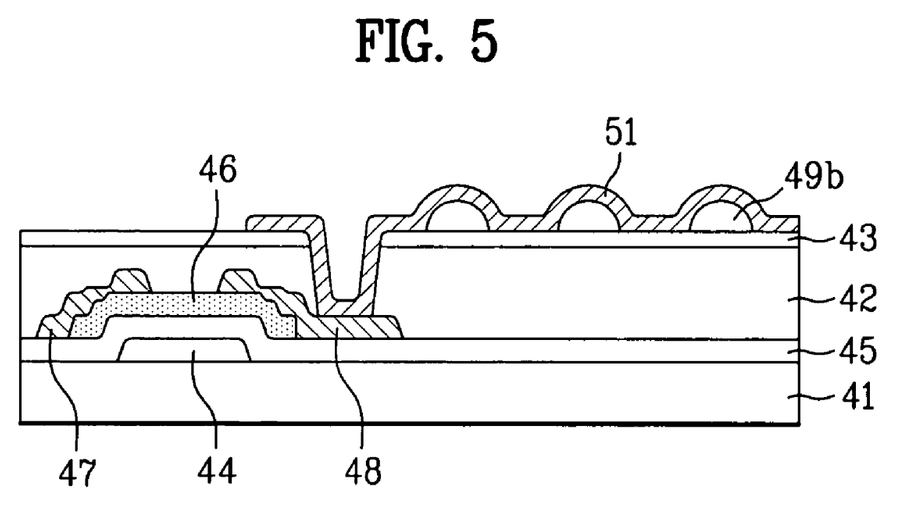
FIG. 5 is a cross-sectional view illustrating an LCD device according to an embodiment of the present invention.

FIG. 5 is a cross-sectional view illustrating an LCD device according to an embodiment of the present invention. As shown in FIG. 5, a thin film transistor T is formed on a predetermined portion of a lower substrate 41, and an insulating layer 42 is formed on the lower substrate 41 including the thin film transistor T. Then, a first photo-acryl layer 43 is formed on the insulating layer 42, and a plurality of protrusions 49b are formed on the first photo-acryl layer 43 at fixed intervals. At this time, the plurality of protrusions 49b are formed of a second photo-acryl layer.

Subsequently, a reflective electrode 51 is formed on the first photo-acryl layer 43 including the plurality of protrusions 49b, for being electrically connected to a drain electrode of the thin film transistor T. At this time, the reflective electrode 51 has an uneven surface due to the plurality of protrusions 49b formed on the first photo-acryl layer 43. Therefore, if the light incident from the outside is reflected and emitted, it is possible to concentrate the light incident on the protrusions 49b at different angles, and to emit the light concentrated to a predetermined angle.

In this case, the thin film transistor T includes a gate electrode 44, a gate insulating layer 45, a semiconductor layer 46, a source electrode 47 and a drain electrode 48. At this time, the gate electrode 44 is formed on a predetermined portion of the lower substrate 41 according to common process steps, and the gate insulating layer 45 is formed on an entire surface of the lower substrate 41 including the gate electrode 44. Also, the semiconductor layer 46 is formed on the gate insulating layer 45 above the gate electrode 44, and the source and drain electrodes 47 and 48 are formed at a predetermined interval, for being partially overlapped with the semiconductor layer 46. Herein, the insulating layer 42 is formed of any one of organic insulating layers such as polyimide, BenzoCycloButen BCB, an oxide layer and a nitride layer at a thickness between 1 μm and 5 μm.

Figure 6A:
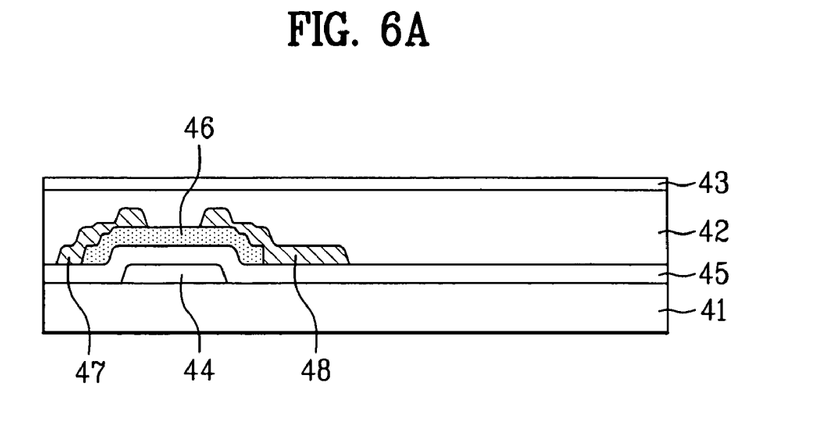
FIG. 6A to FIG. 6F are cross-sectional views illustrating manufacturing process steps of an LCD device according to an embodiment of the present invention.

FIG. 6A to FIG. 6F are cross-sectional views illustrating manufacturing process steps of an LCD device according to the present invention. As shown in FIG. 6A, the insulating layer 42 is formed on an entire surface of the lower substrate 41 including the thin film transistor T. At this time, the insulating layer 42 is formed of any one of the organic insulating layers such as polyimide, BenzoCycloButen BCB, an oxide layer and a nitride layer at a thickness between 1 μm and 5 μm. Subsequently, the first photo-acryl layer 43 is coated on the insulating layer 42 at a thickness between 2 μm and 3 μm. Then, a hard-cure process is performed to the first photo-acryl layer 43, for stably maintaining the first photo-acryl layer 43 during an exposure and developing process.

At this time, the thin film transistor T includes a gate electrode 44, a gate insulating layer 45, a semiconductor layer 46, a source electrode 47 and a drain electrode 48. Herein, the gate electrode 44 is formed on a predetermined portion of the lower substrate 41, and the gate insulating layer 45 is formed on an entire surface of the lower substrate 41 including the gate electrode 44. Also, the semiconductor layer 46 is formed on the gate insulating layer 45 above the gate electrode 44, and the source and drain electrodes 47 and 48 are formed at a predetermined interval, for being partially overlapped with the semiconductor layer 46.

Figure 6B:
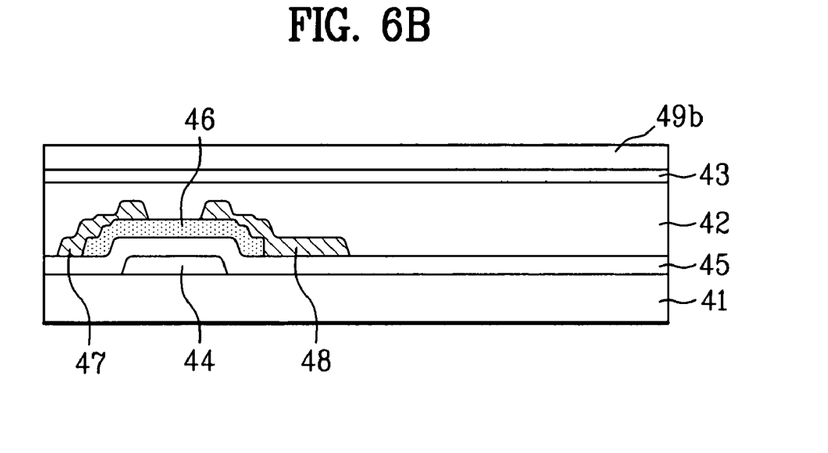
Figure 6C:
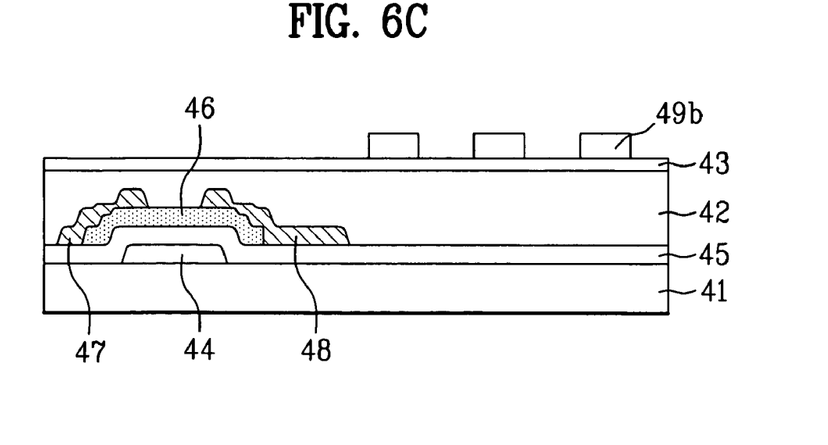

As shown in FIG. 6B, the second photo-acryl layer 49 is coated on the first photo-acryl layer 43 at a thickness between 0.5 μm and 0.8 μm. Referring to FIG. 6C, the second photo-acryl layer 49 is selectively patterned by the exposure and developing process, thereby forming second photo-acryl patterns 49a on the first photo-acryl layer 43 at fixed intervals. As mentioned above, the first photo-acryl layer 43 is performed by a thermal treatment, e.g., such as the hard-cure process, during the exposure and developing process for patterning the second photo-acryl layer 49, so that the first photo-acryl layer 43 is not deformed.

Figure 6D:
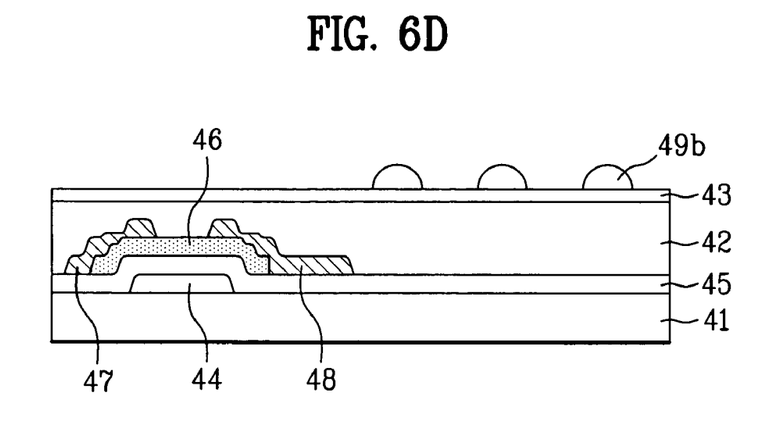

As shown in FIG. 6D, a melt-bake process is performed for reflowing the second photo-acryl pattern 49a, thereby forming the plurality of hemisphere-shaped protrusions 49b having the desired slope. At this time, in order to improve light efficiency, it is preferable to form the protrusion 49b having a height and a radius at a ratio of 1 to 10. Also, the melt-bake process is performed at a temperature between 110° C. and 160° C. Meanwhile, it is possible to obtain the reflexiblity having trapezoidal reflection characteristics by controlling the curvature of the protrusion 49b.

Figure 6E:
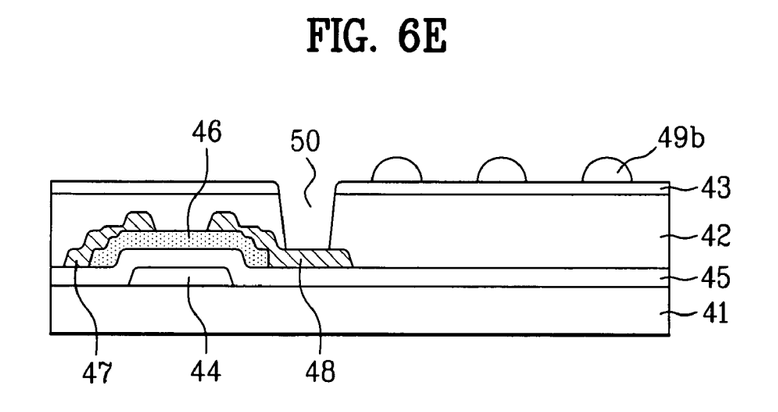
Figure 6F:
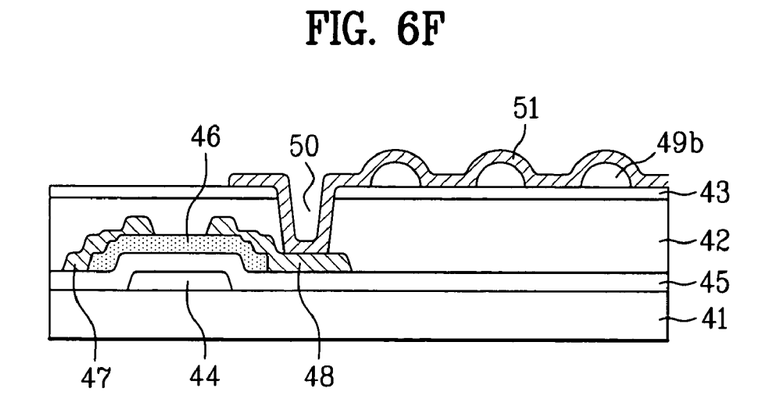

As shown in FIG. 6E, the first photo-acryl layer 43 and the insulating layer 42 are selectively removed for exposing a predetermined portion of the drain electrode 48 of the thin film transistor T, thereby forming a contact hole 50. Referring to FIG. 6F, a conductive opaque metal layer, e.g., such as aluminum Al, having great reflexibility is deposited on the entire surface of the lower substrate 41 including the contact hole 50. Next, the conductive opaque metal layer is selectively removed by photolithography, whereby the reflective electrode 51 is formed for being in contact to the drain electrode. At this time, the reflective electrode 51 serves as a pixel electrode in a pixel region.

The reflective electrode 51 has an uneven surface by the plurality of protrusions 49b formed on the first photo-acryl layer 43. For example, the reflective electrode 51 is formed of any one of opaque metal layers, e.g., such as Al, Ag, MoW, Al—Nd alloy and Cr layer. Thus, the reflective electrode 51 has the uneven surface including the plurality of protrusions, thereby improving reflexibility of the reflective electrode 51.

Figure 7A:
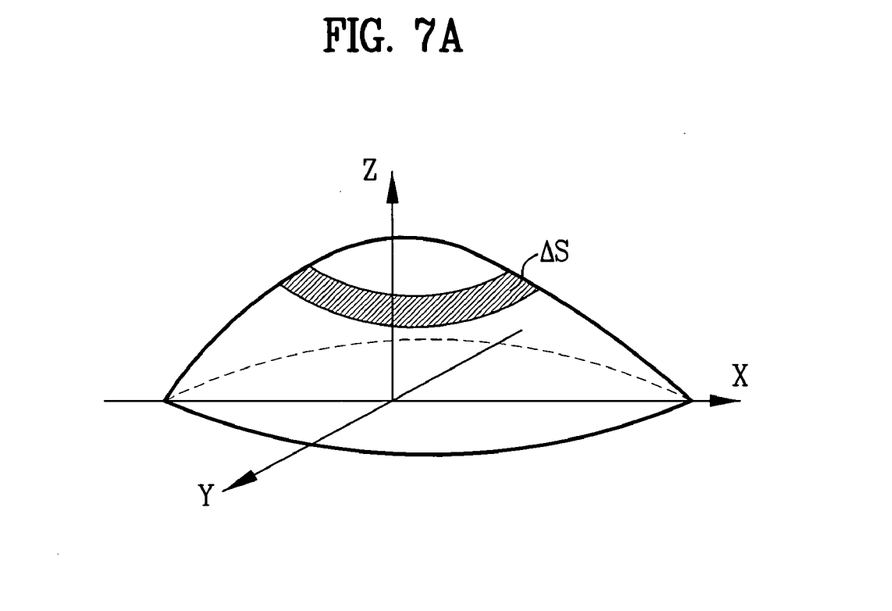
FIG. 7A and FIG. 7B are views illustrating protrusion shapes according to an embodiment of the present invention.
Figure 7B:
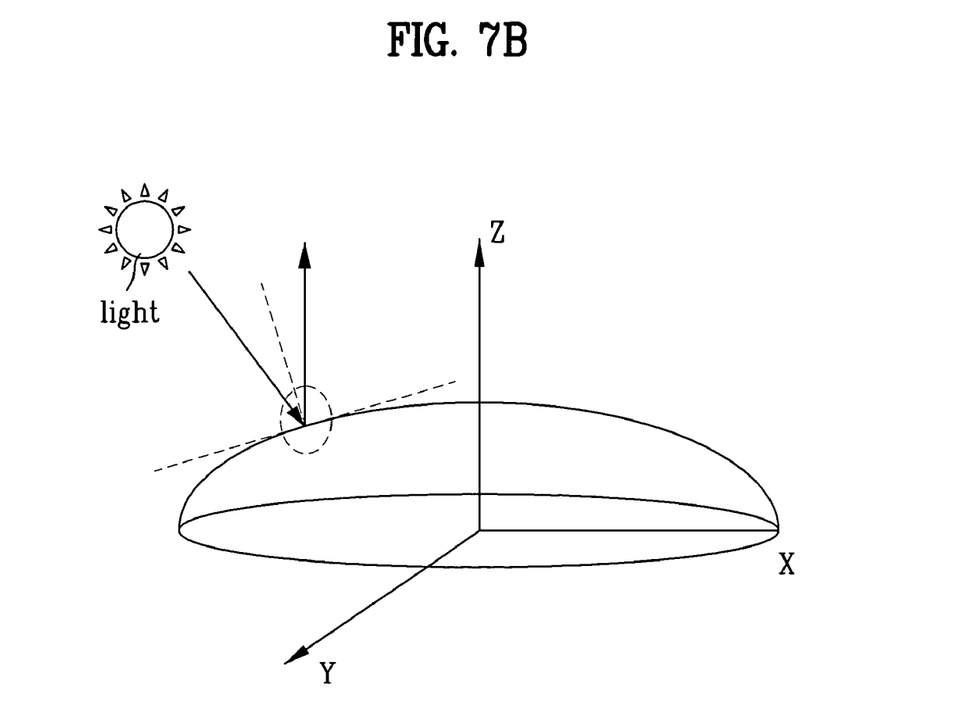

FIG. 7A and FIG. 7B are views illustrating protrusion shapes according to an embodiment of the present invention. As shown in FIG. 7A, a profile function of the protrusion 49b serves as the important element determining the intensity according to a reflection angle of reflected light. It is important to obtain the shape of the protrusion 49b for uniformly distributing the incident light within a range of the viewing angle. Accordingly, the distribution and intensity of the reflected light by the reflection angle are determined.

P(probability)=ΔS/S (herein, ΔS is the surface area in a range where a surface angle of the profile is constant, and S is the surface area of the profile). Therefore, the probability distribution of the unit area ΔS having the predetermined slope θ is very important. Also, according to a study based on current research, the present inventor has determined that it is possible to obtain the optimal front reflexibility in the protrusion having a height and a radius at a ratio of 1 to 10.

In addition, it is preferable to form the protrusion having a radius of 4 µm to 5 µm. Referring to FIG. 7B, the reflective electrode has the uneven surface by the protrusions 49b formed on the first photo-acryl layer, whereby it is possible to concentrate the light incident on the protrusions 49b at different angles, and to emit the light concentrated at a predetermined angle if the light incident from the outside is reflected and emitted.

Figure 8:
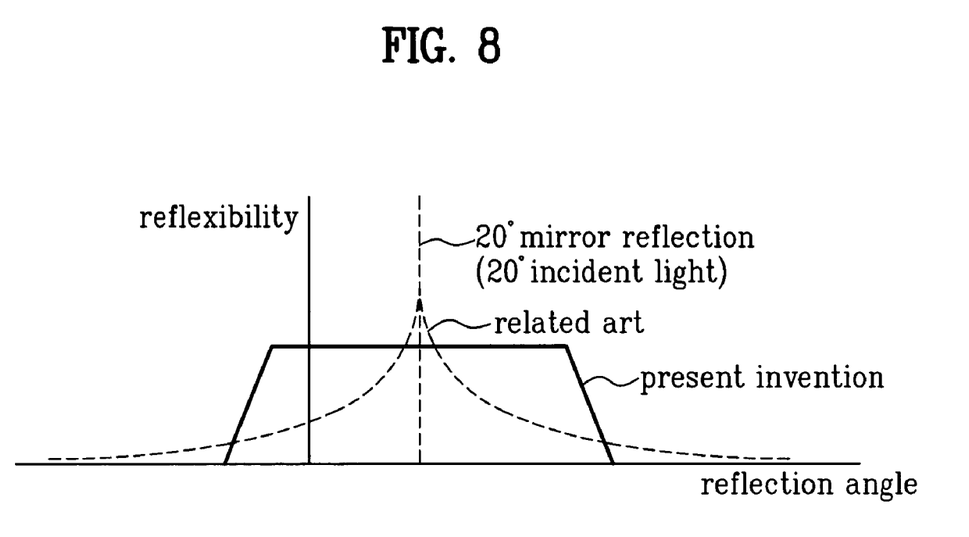
FIG. 8 is a graphical view comparing reflexibility of an LCD device according to the present invention with that of an LCD device according to the background art.

FIG. 8 is a graphical view comparing reflexibility of an LCD device according to an embodiment of the present invention with that of an LCD device according to the background art. Referring to FIG. 8, the first photo-acryl layer 43 is formed as a flattening layer for obtaining high aperture ratio. Also, the second photo-acryl layer 49 is coated on the first photo-acryl layer 43. Herein, the second photo-acryl layer 49 is thinner than the first photo-acryl layer 43. Then, the protrusion 49b removing an inflection point of the curved surface is formed, so that it is possible to decrease mirror reflection and to obtain trapezoidal reflection characteristics having constant reflexibility in the entire reflective scattering viewing angle.

In the background art, when the light is incident at an angle of 20°, the inflection point exists by the second photo-acryl layer formed on the entire surface including the protrusions. Also, as the inflection point V is positioned at the center of the protrusion, it has the problem of increasing the mirror reflection.

As mentioned above, the present invention is described according to the method for manufacturing the reflective type LCD device. However, it is possible to apply the present invention to a transflective type LCD device having a reflective part of which the surface has an uneven surface. Accordingly, in case of the method for manufacturing the reflective type LCD device according to the present invention, the reflective electrode serves as the pixel electrode. However, it is possible to manufacture the transflective type LCD device in which a reflective electrode having an uneven surface is formed, and then a transparent electrode is formed additionally. In this case, the transparent electrode is connected to the drain electrode of the thin film transistor.

Figure 9A:
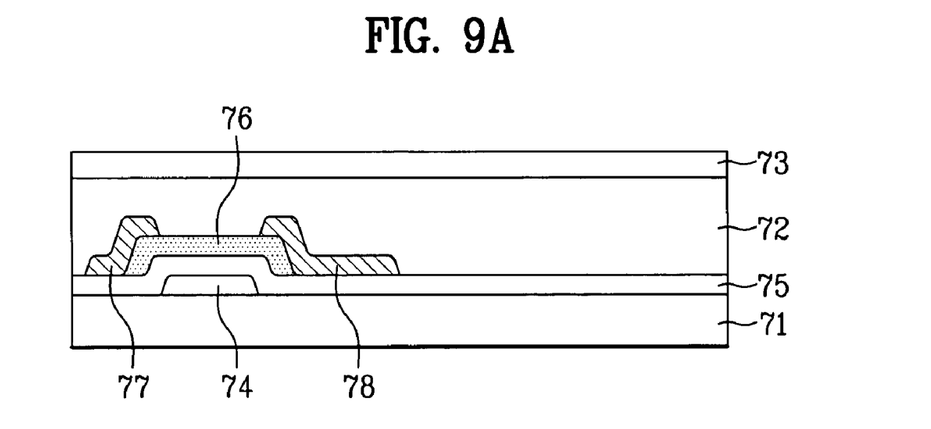
FIG. 9A to FIG. 9G are cross-sectional views illustrating manufacturing process steps of an LCD device according to another embodiment of the present invention.

FIG. 9A to FIG. 9G are cross-sectional views illustrating manufacturing process steps of an LCD device according to another embodiment of the present invention. As shown in FIG. 9A, a first insulating layer 72 is formed on an entire surface of a lower substrate 71 including a thin film transistor T. At this time, the first insulating layer 72 is formed of an organic insulating layer such as polyimide, BenzoCycloButen BCB, an oxide layer or a nitride layer at a thickness between 1 µm and 5 µm.

Subsequently, a first photo-acryl layer 73 is coated on the first insulating layer 72 at a thickness between 2 µm and 3 µm. Then, a hard-cure process is performed to the first photo-acryl layer 73, for stably maintaining the first photo-acryl layer 73 during an exposure and developing process. Herein, the thin film transistor T includes a gate electrode 74, a gate insulating layer 75, a semiconductor layer 76, a source electrode 77 and a drain electrode 78. At this time, the gate electrode 74 is formed on a predetermined portion of the lower substrate 71, and the gate insulating layer 75 is formed on an entire surface of the lower substrate 71 including the gate electrode 74. Also, the semiconductor layer 76 is formed on the gate insulating layer 75 above the gate electrode 74, and the source and drain electrodes 77 and 78 are formed at a predetermined interval, for being partially overlapped with the semiconductor layer 76.

Figure 9B:
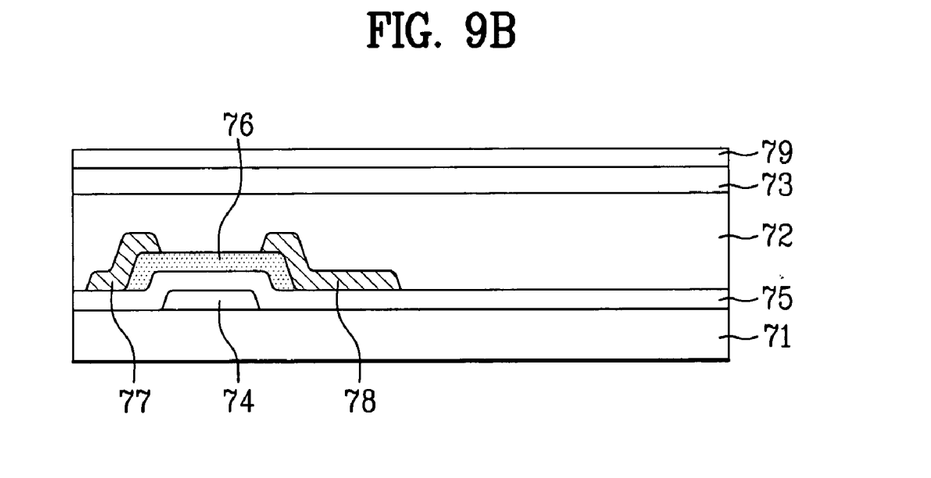
Figure 9C:
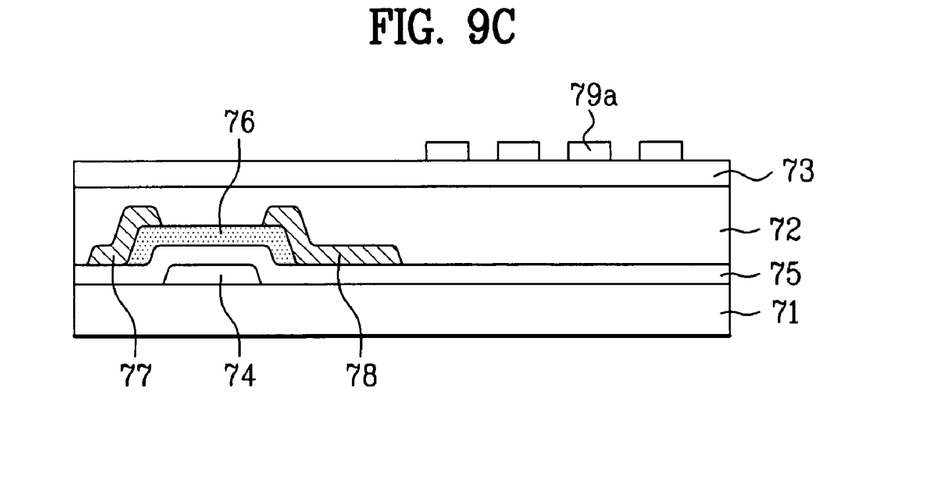

As shown in FIG. 9B, a second photo-acryl layer 79 is coated on the first photo-acryl layer 73 at a thickness between 0.5 µm and 0.8 µm. Referring to FIG. 9C, the second photo-acryl layer 79 is selectively patterned by the exposure and developing process, thereby forming second photo-acryl patterns 79a. In this case, the first photo-acryl layer 73 is performed by a thermal treatment such as the hard-cure process, during the exposure and developing process for patterning the second photo-acryl layer 79, so that the first photo-acryl layer 73 is not deformed.

Figure 9D:
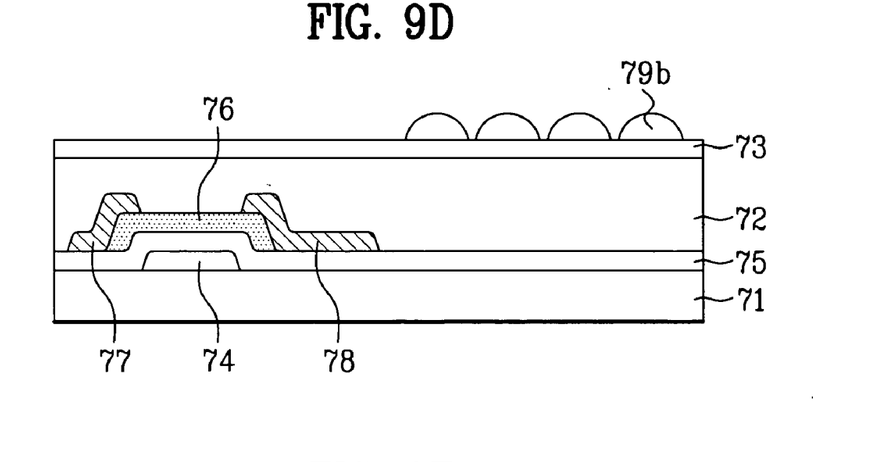

As shown in FIG. 9D, a melt-bake process is performed to the second photo-acryl patterns 79a, thereby forming a plurality of hemisphere-shaped protrusions 79b having the desired slope by reflowing the second photo-acryl patterns 79a. At this time, it is preferable to form the protrusion 79b having a height and a radius at a ratio of 1 to 10 so as to improve light efficiency. Meanwhile, the curvature of the protrusion 79b is controlled to obtain the reflexibility having trapezoidal reflection characteristics.

Figure 9E:
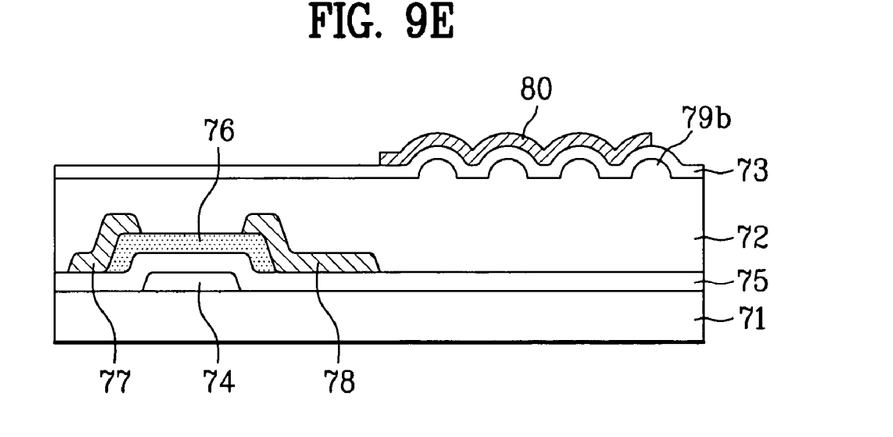

As shown in FIG. 9E, an opaque metal layer is deposited on the entire surface of the lower substrate 71 including the protrusions 79b, and then selectively removed by photolithography, thereby forming a reflective electrode 80. At this time, the reflective electrode 80 has an uneven surface by the protrusions 79b formed on the first photo-acryl layer 73. In a preferred embodiment the opaque metal layer may be formed of any one of Al, Ag, MoW, Al—Nd alloy and Cr layer.

Figure 9F:
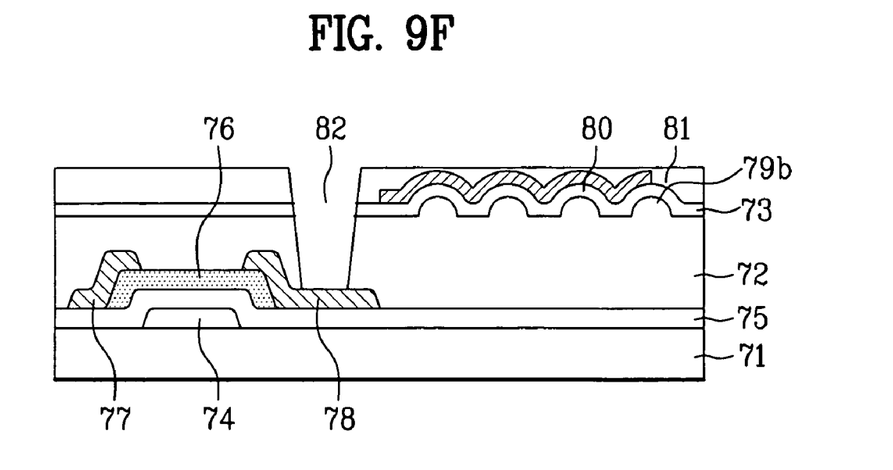

Referring to FIG. 9F, a second insulating layer 81 is formed on an entire surface of the lower substrate 71 including the reflective electrode 80. Then, the second insulating layer 81, the first photo-acryl layer 73 and the first insulating layer 72 are selectively removed by photolithography so as to expose a predetermined portion of the drain electrode 78, thereby forming a contact hole 82.

Figure 9G:
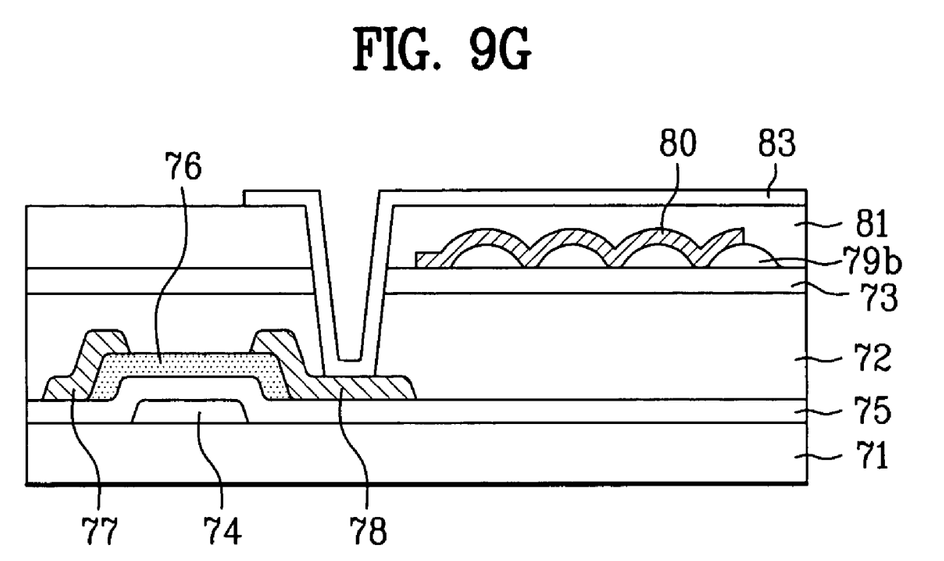

Referring to FIG. 9G, a transparent metal layer is deposited on the entire surface of the lower substrate 71 including the contact hole 82, and then selectively removed by photolithography. A transparent electrode 83 covering the reflective electrode 80 is formed for being electrically connected with the drain electrode 78 through the contact hole 82. At this time, the transparent metal layer is formed of ITO (Indium-Tin-Oxide), IZO (Indium-Zinc-Oxide) or ITZO (Indium-Tin-Zinc-Oxide) by CVD method or sputtering method.

Figure 10:
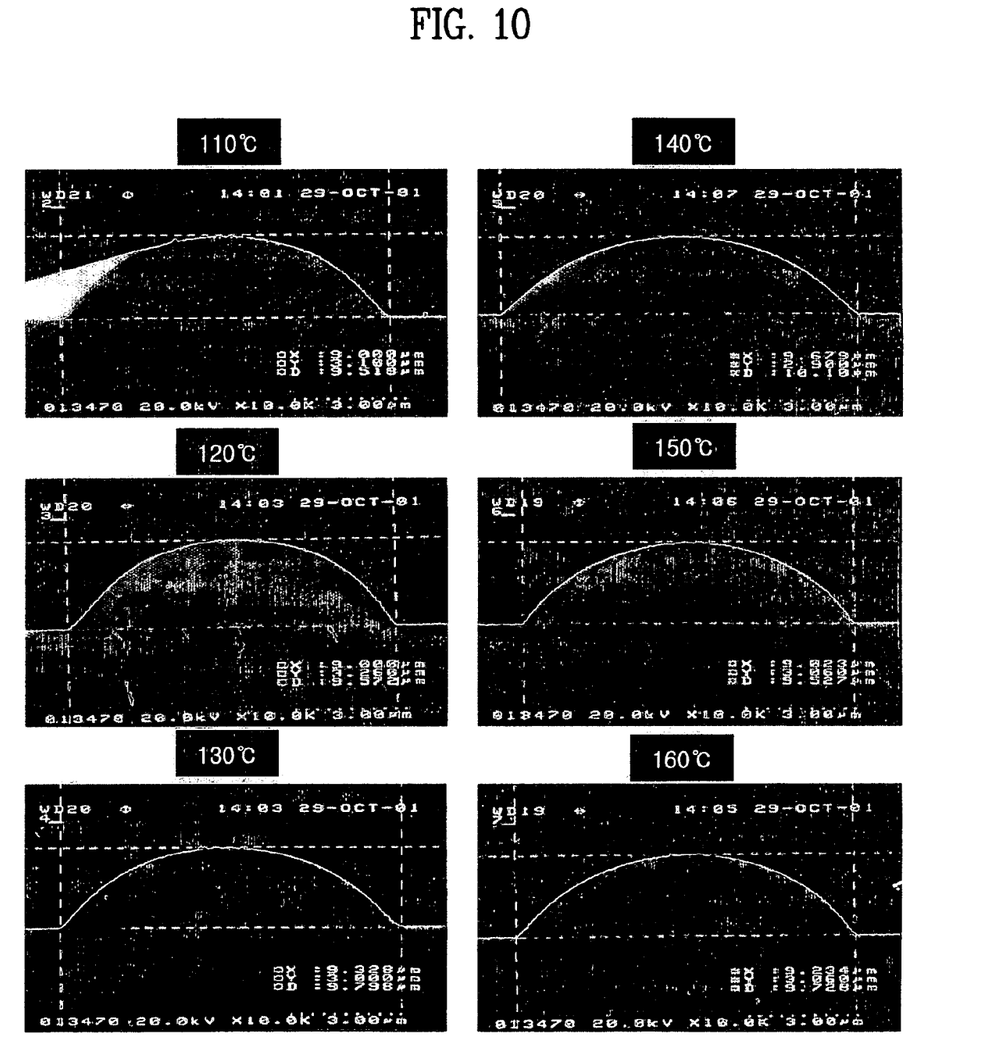
FIG. 10 is a photograph showing a protrusion shape according to temperature and time when melt-baking a second photo-acryl pattern.

FIG. 10 is a photograph showing a protrusion shape according to temperature and time when melt-baking the second photo-acryl pattern. As shown in FIG. 10, the curvature of the entire protrusion is affected only with the temperature of the melt-bake process for the second photo-acryl pattern. In this respect, the temperature (approximately 110–160° C.) and time of the melt-bake process is controlled so as to control the curvature of the second photo-acryl layer.

In the background art process steps, it is possible to control the top of the protrusion and the hollow space between the protrusions. Meanwhile, in the process steps according to the present invention, it is possible to easily control the reflexibility of the reflection angle by controlling the curvature of the protrusion.

Figure 11B:
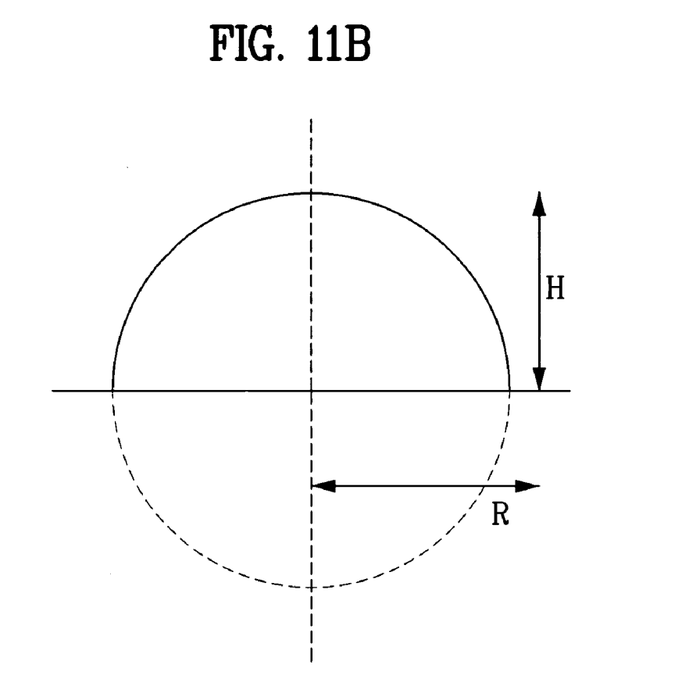

FIG. 11A and FIG. 11B are views comparing a protrusion shape according to the present invention with that according to the background art. As shown in FIG. 11A, the inflection point V exists in a curved surface profile of the protrusion in the background art. Further, as the inflection point V is positioned at the center of the protrusion, it has the problem of increasing mirror reflection. Meanwhile, the inflection point V does not exist in the protrusion according to the present invention, as shown in FIG. 11B, whereby it is possible to decrease mirror reflection.

At this time, unexplained 'H' is a height of the protrusion, 'R' is a radius of the protrusion, 'b' is an existence length of the inflection point V, 'Hb' is a height of the portion corresponding to the inflection point V, 'Ha' is a height subtracting the height 'Hb' of the portion corresponding to the inflection point V from the height 'H' of the protrusion, and 'a' is a length subtracting the existence length 'b' of the inflection point V from the radius 'R' of the protrusion.

As mentioned above, the LCD device according to the present invention and the method for manufacturing the same has the following advantages. First, the plurality of protrusions are formed on the first photo-acryl layer used as the flattening layer, so that it is possible to remove the inflection point, thereby decreasing the mirror reflection, and obtaining the trapezoidal reflection characteristics having the constant reflexibility in the entire reflective scattering viewing angle.

In the LCD device according to the present invention and the method for manufacturing the same, it is possible to remove the problem generated by the diffraction exposure method and the diffraction mask requiring accuracy, thereby simplifying the manufacturing process steps. Also, the reflective electrode having the uneven surface by the protrusions is formed according to the simplified manufacturing process steps. Thus, it is possible to obtain the high-quality reflective or transflective type LCD device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display (LCD) device comprising:
    a thin film transistor on a substrate, a data line being connected to a source region of the thin film transistor;
    an insulating layer on an entire surface of the substrate including the thin film transistor;
    a first photo-acryl layer on the insulating layer, the first photo-acryl layer being out of direct contact with the data line;
    a plurality of protrusions being formed on the first photo-acryl layer at fixed intervals, wherein the protrusions are formed of a second photo-acryl layer; and
    a reflective electrode being formed on the first photo-acryl layer, said reflective electrode being capable of being connected to a predetermined portion of the thin film transistor.

2. The LCD device according to claim 1, wherein each of said protrusions has a height and a radius at a ratio of 1 to 10.

3. The LCD device according to claim 1, wherein the first photo-acryl layer is thicker than the second photo-acryl layer.

4. The LCD device according to claim 1, wherein a curved surface reflexibility of each of said protrusions has trapezoidal reflection characteristics.

5. A method for manufacturing a liquid crystal display (LCD) device comprising:
    forming a thin film transistor on a substrate;
    forming a data line connected to a source region of the thin film transistor;
    forming an insulating layer on the substrate;
    forming a first photo-acryl layer on the insulating layer to be out of direct contact with the data line;
    performing a hard-cure process on the first photo-acryl layer;
    forming a plurality of second photo-acryl patterns on the first photo-acryl layer at fixed intervals;
    forming a plurality of protrusions by reflowing the second photo-acryl patterns; and
    forming a reflective electrode on an entire surface including the protrusions.

6. The method according to claim 5, wherein the insulating layer is formed of an organic insulating layer.

7. The method according to claim 5, wherein the insulating layer is formed of any one of the group consisting of polyimide, BCB, an oxide layer and a nitride layer.

8. The method according to claim 5, wherein the first photo-acryl layer is thicker than the second photo-acryl layer.

9. The method according to claim 5, wherein the first photo-acryl layer is formed at a thickness between 2 μm and 3 μm.

10. The method according to claim 5, wherein the second photo-acryl layer is formed at a thickness between 0.5 μm and 0.8 μm.

11. The method according to claim 5, furthering comprising performing a melt-bake process on the second photo-acryl patterns at a temperature between 110° C. and 160° C. so as to form the protrusions.

12. The method according to claim 5, wherein the reflective electrode is formed of any one of the group consisting of Al, Ag, MoW, Al—Nd alloy and a Cr layer.

13. The method according to claim 5, further comprising controlling the curvature of the protrusions to achieve reflexibiltiy having trapezoidal reflection characteristics.

14. A method for manufacturing a liquid crystal display (LCD) device comprising:
forming a thin film transistor on the substrate;
forming a data line connected to a source region of the thin film transistor
forming a first insulating layer on an entire surface of the substrate including the thin film transistor;
forming a first photo-acryl layer on the first insulating layer to be out of direct contact with the data line;
performing a hard-cure process on the first photo-acryl layer;
forming a plurality of second photo-acryl patterns on the first photo-acryl layer at fixed intervals;
forming a plurality of protrusions by reflowing the second photo-acryl patterns;
forming a reflective electrode on a predetermined portion of the first photo-acryl layer including the plurality of protrusions;
forming a second insulating layer on an entire surface of the substrate including the reflective electrode;
forming a contact hole exposing a predetermined portion of the thin film transistor by selectively removing the second insulating layer, the first photo-acryl layer and the first insulating layer; and
forming a transparent electrode being electrically connected with the thin film transistor through the contact hole.

15. The method according to claim 14, wherein the first and second insulating layers are formed of the same insulating layer.

16. The method according to claim 14, wherein the first and second insulating layers are formed of any one of the group consisting of polyimide, BCB, an oxide layer and a nitride layer.

17. The method according to claim 14, wherein the first insulating layer is formed at a thickness between 1 µm and 5 µm.

18. The method according to claim 14, wherein the transparent electrode is formed of any one of the group consisting of Indium-Tin-Oxide (ITO), Indium-Zinc Oxide (IZO) and Indium-Tin-Zinc-Oxide (ITZO).

19. The method according to claim 14, wherein the first photo-acryl layer is thicker than the second photo-acryl layer.

20. The method according to claim 14, further comprising controlling the curvature of the protrusions to achieve reflexibiltiy having trapezoidal reflection characteristics.

21. The LCD device according to claim 1, wherein an upper surface of the insulating layer is planar.

22. The LCD device according to claim 1, wherein the insulating layer has only a contact hole for the thin film transistor and the only contact hole is through the insulating layer.

23. The method according to claim 5, wherein the step of forming the insulating layer includes forming the insulating layer having a planar upper surface.

24. The method according to claim 5, further comprising forming only a contact hole through the insulating layer for the thin film transistor.

25. The method according to claim 14, wherein the step of forming the first insulating layer includes forming the first insulating layer having a planar upper surface.

26. The method according to claim 14, further comprising forming only a contact hole through the first insulating layer for the thin film transistor.

* * * * *